US008189986B2

(12) United States Patent
Schlarb

(10) Patent No.: US 8,189,986 B2
(45) Date of Patent: May 29, 2012

(54) MANUAL PLAYBACK OVERSHOOT CORRECTION

(75) Inventor: John Murray Schlarb, Duluth, GA (US)

(73) Assignee: Cisco Technology, Inc., San Jose, CA (US)

( * ) Notice: Subject to any disclaimer, the term of this patent is extended or adjusted under 35 U.S.C. 154(b) by 781 days.

(21) Appl. No.: 12/367,691

(22) Filed: Feb. 9, 2009

(65) Prior Publication Data

US 2010/0202752 A1 Aug. 12, 2010

(51) Int. Cl.
*G06F 21/00* (2006.01)
(52) U.S. Cl. .......................................... 386/68; 386/234
(58) Field of Classification Search ..................... 386/68, 386/234
See application file for complete search history.

(56) References Cited

U.S. PATENT DOCUMENTS

| 6,075,919 A | 6/2000 | Omoto et al. |
| 6,850,691 B1 | 2/2005 | Stam et al. |
| 2003/0108330 A1 | 6/2003 | Jo |
| 2004/0230994 A1 | 11/2004 | Urdang et al. |
| 2005/0022245 A1 | 1/2005 | Nallur et al. |
| 2005/0163477 A1* | 7/2005 | Kendall .......................... 386/68 |
| 2006/0075440 A1 | 4/2006 | Rijckaert |

FOREIGN PATENT DOCUMENTS

WO    WO 03/088238 A1    10/2003

OTHER PUBLICATIONS

International Search Report dated Apr. 12, 2010 cited in Application No. PCT/US2010/023285.

* cited by examiner

*Primary Examiner* — Vivek Srivastava
*Assistant Examiner* — Thong Truong
(74) *Attorney, Agent, or Firm* — Merchant & Gould

(57) ABSTRACT

A video display function that addresses fast-forward overshoot. Holding down a play key during a fast forward function, for longer than a predetermined amount of time, causes a video presentation to be placed in reverse mode until the play key is released. This allows a user to manually, and easily, control how far to back up a given video presentation after a fast forward operation, without having to separately engage a rewind key.

20 Claims, 3 Drawing Sheets

MANUAL PLAYBACK OVERSHOOT CORRECTION

TECHNICAL FIELD

The present disclosure relates to video playback, and particularly to correction techniques for fast forward overshoot.

BACKGROUND

Users of video cassette recorders (VCRs) and digital video recorders (DVRs) often use the "fast-forward" function to skip commercials, or simply to move past selected scenes of a given previously-recorded program. In the case of skipping commercials, a user might watch the screen for signs that the normal program is resuming (e.g. a large "TV-PG" might appear at the upper left hand side of the screen) and then press a PLAY key (on, e.g. a remote control device) to resume normal play speed. However, due to a typical user's response time and eye-hand coordination, by the time the user actually presses the PLAY key and the VCR or DVR responds to that command, the actual resumed play point is often several seconds past the point that was intended. This phenomenon is generally referred to as fast forward "overshoot."

When overshoot occurs, a user might then press a rewind key to move back in time to the originally-intended point in the programming, only to overshoot in the opposite direction. In such a case, a user is forced to watch a portion of the programming/commercial in which he has no interest, or he might again attempt a fast forward operation, which again might result in the original overshoot problem.

DESCRIPTION OF EXAMPLE EMBODIMENTS

Overview

Embodiments of the present invention provide methods and systems for controlling overshoot of a video presentation on a display. Embodiments provide, for example, receiving an indication to fast forward the video presentation, and performing a fast forward operation such that the video presentation is displayed at a second speed that is faster than a first (play) speed. Thereafter, an indication is received to stop the fast forward operation and play the video presentation at the first speed, e.g., by detecting that a PLAY key has been pressed. It is then detected whether the indication to stop the fast forward operation and play the video presentation at the first (play) speed is provided for longer than a predetermined amount of time, e.g., it is determined whether the PLAY key has been continually pressed for more than a set amount of time. If this is the case, the video presentation is then played in reverse at a third speed until it is detected that the PLAY key has been released. The third speed may be the same speed as the forward play speed, or may be faster. The third speed may even be selected based on the most recent reverse/rewind speed.

These and other embodiments of the present invention are more fully described below.

Figure 1:
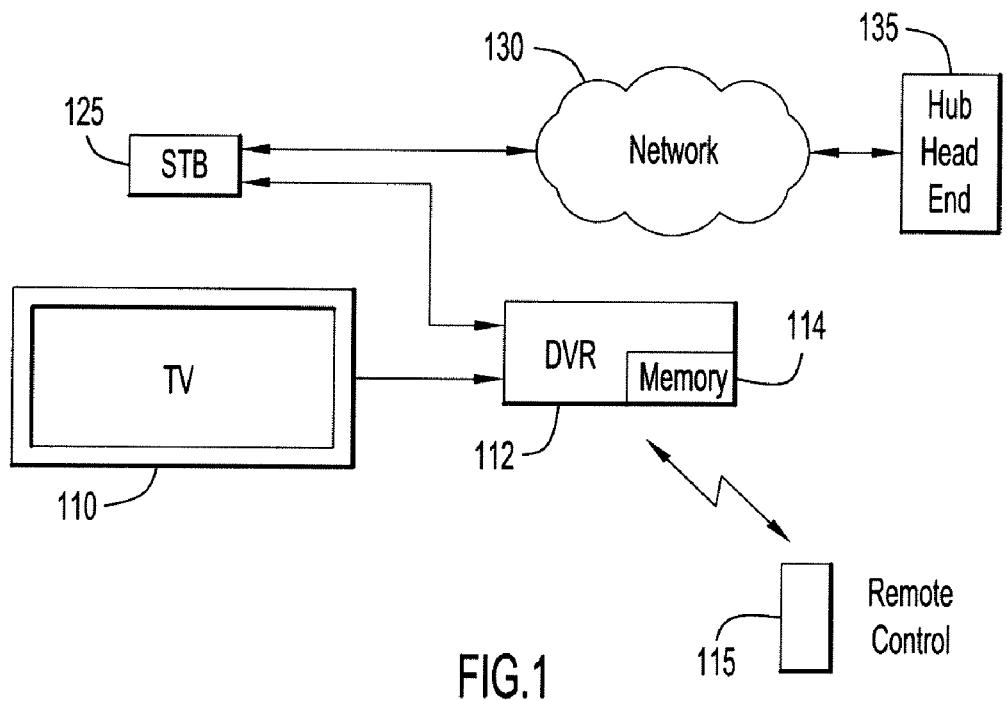
FIG. 1 shows a typical equipment and network configuration in connection with which embodiments of the present invention may be implemented.

FIG. 1 shows a typical equipment and network configuration in connection with which embodiments of the present invention may be implemented. Specifically, a television 110 (which may also be a computer display or other display device) is connected to a digital video recorder (DVR) 112 having an internal memory 114, such a solid state memory, a disk drive, or combinations thereof. Memory 114, in accordance with the present invention may also include a buffer memory that may be employed in connection with embodiments of the present invention.

Figure 2:
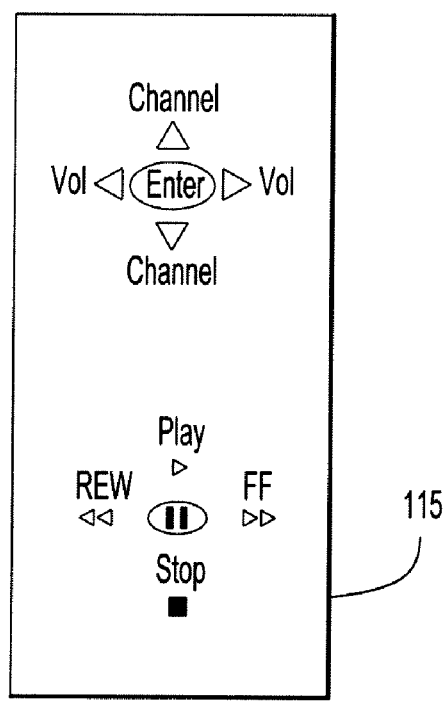
FIG. 2 depicts a remote control device that is operable with embodiments of the present invention.

In a known manner, a remote control device 115 can be used to remotely control DVR 112. FIG. 2 depicts a typical remote control device 115 that may be used in connection with the present invention. Referring still to FIG. 1, a set top box (STB) 125 is shown connected to a network 130, such as a proprietary cable network, or public network operating in accordance with TCP/IP. Network 130 may also be connected to a hub or head end 135 from which content, including video programming is sourced. Though not expressly shown, STB 125 may be in communication with a satellite terminal for receiving satellite transmission of video and audio content.

As also shown, STB 125 is in communication with DVR 112 such that content provided over network 130 from hub or head end 135 can be recorded in real time as the programming is received. Programming may include traditional network programming including commercial advertisements, as well as pay per view and other well-known types of programming. Also, it should be noted that while DVR 112 and STB 125 are shown as two separate devices, these devices may be combined into a single unit. The content, programming, or video presentation may be, at least at one point, in a format in accordance with a moving pictures expert group (MPEG) format.

Remote control 115, shown in FIG. 2, includes well-known buttons or keys including channel and volume keys, an enter key, and for purposes of embodiments of the present application, DVR or (or even VCR) command keys, including PLAY, STOP, FAST FORWARD (FF), reverse or REWIND (REW), and PAUSE. A user, by pressing any one of these keys can control the operation of DVR 112, and thus what is depicted on television or display 110.

In accordance with embodiments of the present invention, and to address the overshoot problem mentioned above, DVR 112, in conjunction with remote control 115, is configured to function in a unique way. Specifically, if a user presses the PLAY key on remote control 115 (or similar key on the DVR 112 itself) while DVR 112 is in fast-forward mode, and holds this key down for greater than, e.g., one half second, the DVR enters a 1× REWIND mode and maintains this mode until the user releases the PLAY key, whereupon the DVR 112 resumes normal play. This allows the user to rewind at a more appropriate speed until the desired video frame is found.

In one embodiment of the present invention, different rewind speeds may be implemented depending on the fast-forward speed in use when the user pressed the PLAY key for an extended period of time. For example, DVR 112 may rewind at 2× if the user was using 60× fast forward. This may assist the user in better locating the desired frame assuming a user's reflexes are substantially the same regardless of fast forward speed. In accordance with a preferred embodiment, the rewind speed triggered by an extended-press PLAY key, is configurable by a user.

Figure 3:
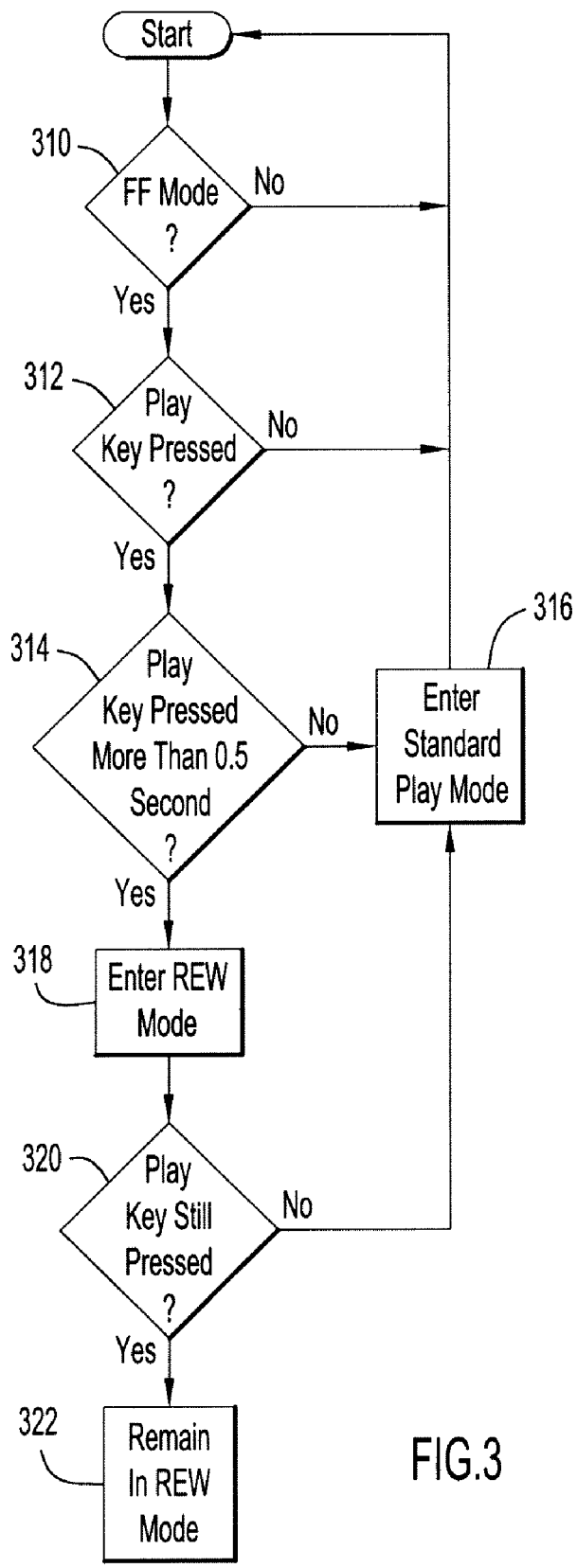
FIG. 3 is a flow chart of one possible embodiment of the present invention.

Reference is now made to FIG. 3, which shows a flow chart of one possible embodiment of the present invention. At step 310 it is determined whether the DVR 112 is in fast-forward mode. If not, then the process returns to a start mode. If the DVR 112 is already in a fast forward mode, then at step 312, it is determined whether the PLAY key has been pressed. At this point, a distinction must be made between whether the PLAY key has been pressed momentarily to command a conventional play mode, or whether, as indicated by step 314, the PLAY key has been pressed for some extended period of time, e.g., one half second. If the PLAY key was depressed only momentarily, e.g., less than one half second, then a regular play mode is initiated, as indicated by step 316.

If the PLAY key is detected as being pressed for more than one half second (or other predetermined amount of time), then at step 318, the DVR 112 enters a rewind mode, at which point the video presentation is presented in reverse. The reverse speed may be the same speed as the normal PLAY mode (albeit in reverse), or it may be faster. For instance, if the FAST FORWARD speed was 60 times (60×) normal speed, then it may be desirable to have the reverse speed associated with an extended PLAY key press to be 2×, 3× or some other speed. In a preferred embodiment, the reverse speed associated with an extended PLAY key press is configurable by a user (e.g., via an on screen display menu selection).

At step 320 it is determined whether the PLAY key is still being pressed. If so, this indicates that REWIND mode associated with extended PLAY key press is still desired and thus, at step 322, the DVR 112 remains in this REWIND mode. If at step 320, the PLAY key is no longer being pressed, then the DVR 112 enters into standard PLAY mode, wherein the video presentation is displayed in forward, normal speed.

DVRs or other media devices that are configured to operate in accordance with embodiments of the present invention require only a slight modification to the logic associated with remote control functionality. Specifically, a timer is preferably incorporated into the logic to monitor how long the PLAY key is depressed. Such counters are well-known to those skilled in the art.

Figure 4:
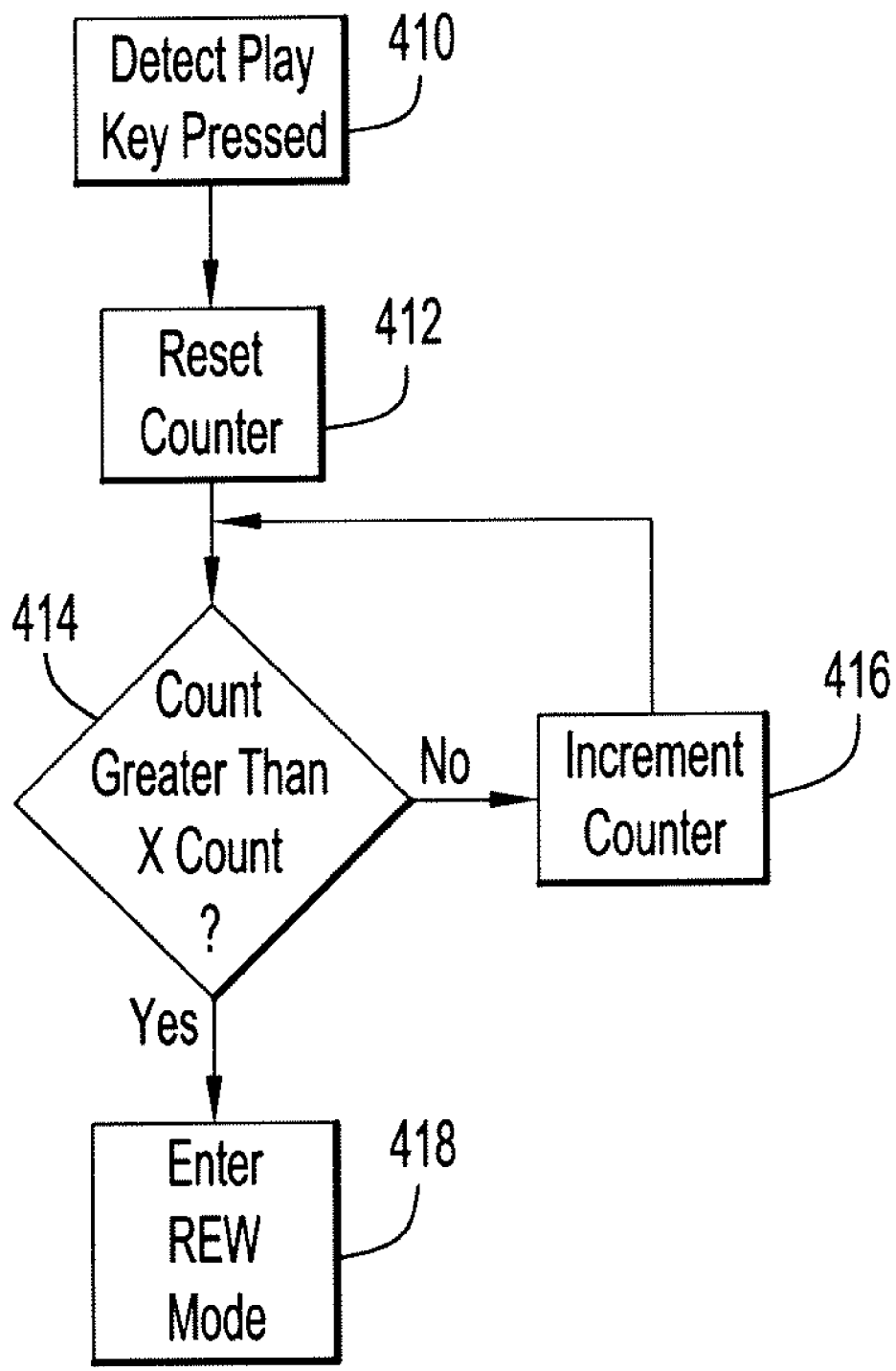
FIG. 4 is a flow chart of how a counter may be employed to monitor the length of time a key is pressed in accordance with an embodiment of the present invention.

For example, FIG. 4 depicts a process that incorporates a counter in accordance with an embodiment of the present invention. As step 410 it is detected whether the PLAY key has been pressed. If so, then at step 412, a counter is reset. That counter is then allowed to count up via step 416 (or down depending on how implemented) and it is thereafter determined, at step 414, whether the count is, e.g., greater than some predetermined (X) count. If so, then at step 418 the logic is configured to place the DVR 112 into REWIND mode until the PLAY key is released, as explained above.

For the REWIND operation itself, as is well-known in the art, portions of video such as Groups of Pictures (GOPs) are decoded in the forward direction and stored in memory, such as a buffer in memory 114, and then played back. Alternatively, only I-frames could be used for the REWIND operation, thereby saving significant memory and avoiding additional processing. In such a case, where multiple frames are typically located between I-frames, a given I-frame can be displayed for each of the frames (B or P frames) that are not displayed thereby maintaining overall timing.

As mentioned above, without the functionality described herein, a user, in trying to pass over a certain portion of a video presentation, such as a commercial or particular scene, using FAST FORWARD mode, will often need to initiate a conventional REWIND operation after pressing the PLAY key at the moment the user intends to begin watching the video presentation since, due to FAST FORWARD overshoot. The REWIND operation, however, may only lead to overshoot in the opposite direction, still leaving the user in an unintended location in the continuum of the video presentation. With the functionality of embodiments of the present invention, on the other hand, by simply continuing to hold down the PLAY key when the intended frame is seen, the user can rewind the video presentation at a more controlled speed, and without having to press another key. In this way, the user can arrive at the actual intended frame for video presentation play re-start.

Those skilled in the art will appreciate that the present invention could also be implemented using a totally separate/new key on remote control 115, rather than expanding the functionality of the PLAY key. For instance a new key (not shown), such as a PLAY/REW key could be provided on the remote control. Such a key could operate to rewind the video presentation until it is no longer pressed, whereupon normal PLAY mode would resume.

Also, embodiments of the present invention may be employed with VCRs or any other playback media device that stores and replays video.

Finally, the while embodiments of the present invention have been described in connection with a local DVR or STB, it is also possible that the video content itself is stored remotely (i.e., outside of customer premises) and is accessed via network 130, as shown in FIG. 1. In such a case, the several commands, including FAST FORWARD, PLAY and REW would be transmitted over the network 130, and the hub or head end 135 would provide the appropriate video presentation stream.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method for controlling a video presentation on a display, comprising:
   receiving, in response to a first key, an indication to fast forward the video presentation, and performing a fast forward operation such that the video presentation is displayed at a second speed that is faster than a first speed;
   receiving, in response to a second key, an indication to stop the fast forward operation and to play the video presentation at the first speed;
   detecting, in response to the second key, that the indication to stop the fast forward operation and to play the video presentation at the first speed is provided for longer than a predetermined amount of time; and
   in response to detecting that the indication to stop the fast forward operation and to play the video presentation at the first speed is provided for longer than the predetermined amount of time, playing the video presentation in reverse at a third speed.

2. The method of claim 1, further comprising playing the video presentation in reverse at the third speed until the indication to stop the fast forward operation and to play the video presentation at the first speed is no longer detected.

3. The method of claim 1, further comprising receiving the indication to fast forward the video presentation from a remote control device.

4. The method of claim 1, further comprising receiving an indication to stop the fast forward operation and to play the video presentation at the first speed from a remote control device.

5. The method of claim 1, wherein the third speed is the same as the first speed.

6. The method of claim 1, wherein the predetermined amount of time is about 0.5 second.

7. The method of claim 1, further comprising selecting a speed of the third speed based on the second speed.

8. The method of claim 1, further comprising receiving the video presentation from a hub that is outside of a customer premises.

9. The method of claim 1, wherein the video presentation is, at least at one point, in a format in accordance with a moving pictures expert group (MPEG) format.

10. A system, comprising:
a media device configured to be connected to a display;
the media device further configured to provide a video presentation to the display at first play speed, a second fast forward speed and a third rewind speed, the media device still further being configured to:
  receive, in response to a first key, an indication to fast forward the video presentation and to perform a fast forward operation such that the video presentation is displayed at the second fast forward speed that is faster than the first play speed;
  receive, in response to a second key, an indication to stop the fast forward operation and to play the video presentation at the first speed;
  detect, in response to the second key, that the indication to stop the fast forward operation and to play the video presentation at the first speed is provided for longer than a predetermined amount of time; and
  in response to detecting that the indication to stop the fast forward operation and to play the video presentation at the first speed is provided for longer than the predetermined amount of time, play the video presentation in reverse at a third rewind speed.

11. The system of claim 10, wherein the media device is a digital video recorder (DVR).

12. The system of claim 10, wherein the media device is a set top box (STB).

13. The system of claim 10, wherein the media device is further configured to play the video presentation in reverse at the third rewind speed until the indication to stop the fast forward operation and to play the video presentation at the first play speed is no longer detected.

14. The system of claim 10, wherein the media device is configured to receive the indication to fast forward the video presentation from a remote control device.

15. The system of claim 10, wherein the media device is configured to receive the indication to stop the fast forward operation and to play the video presentation at the first play speed from a remote control device.

16. The system of claim 10, wherein the third rewind speed is the same as the first play speed.

17. The system of claim 10, wherein the predetermined amount of time is about 0.5 second.

18. The system of claim 10, wherein a speed of the third rewind speed is based on the second fast forward speed.

19. The system of claim 10, further comprising a hub from which the video presentation is received, wherein the hub is outside of a customer premises.

20. The system of claim 10, wherein the video presentation is, at least at one point, in a format in accordance with a moving pictures expert group (MPEG) format.

* * * * *